United States Patent [19]
Recker et al.

[11] Patent Number: 4,956,598
[45] Date of Patent: Sep. 11, 1990

[54] LOW DISTORTION CONTROL FOR A VSCF GENERATING SYSTEM

[75] Inventors: Bradley J. Recker; Thong-Meng Cheng; Derrick I. Roe, all of Rockford, Ill.; Christopher J. Rozman, Delavan, Wis.

[73] Assignee: Sundstrand Corporation, Rockford, Ill.

[21] Appl. No.: 285,423

[22] Filed: Dec. 16, 1988

[51] Int. Cl.⁵ .................... H02P 9/42; H02M 5/32; H02J 3/00
[52] U.S. Cl. ........................ 322/28; 322/29; 322/32; 307/16; 307/76
[58] Field of Search ............... 322/10, 11, 28, 29, 322/32, 40; 290/38, 46 R; 363/41; 307/16, 76

[56] References Cited
U.S. PATENT DOCUMENTS 3,858,107 12/1974 Yarrow et al. ............... 322/32 X
4,035,712 7/1977 Yarrow et al. ............... 322/32 X
4,527,226 7/1985 Glennon ........................ 363/41
4,554,501 11/1985 Baker ............................ 322/29

Primary Examiner—R. J. Hickey
Attorney, Agent, or Firm—Marshall, O'Toole, Gerstein, Murray & Bicknell

[57] ABSTRACT

Prior variable speed constant frequency (VSCF) generating systems which utilize an inverter to derive constant frequency power from variable frequency power developed by a generator driven by a prime mover have controlled system output voltage by controlling the excitation of the generator. Such a control technique, however, does not provide voltage regulation of individual phases and minimize undesirable distortion in the system output. In order to overcome the foregoing problem, a control for a VSCF system having a generator and an inverter which receives DC power from a rectifier coupled to the generator controls switches in the inverter to maintain the voltage of the AC power developed by the inverter at a desired level and controls the power applied to an exciter of the generator to maintain the voltage of the DC power at a particular level relative to the voltage of the AC power developed thereby. Distortion in the inverter output is thereby minimized.

16 Claims, 5 Drawing Sheets

LOW DISTORTION CONTROL FOR A VSCF GENERATING SYSTEM

TECHNICAL FIELD

The present invention relates generally to power system controls, and more particularly to a control for a variable speed, constant frequency (VSCF) power generating system.

BACKGROUND ART

There are numerous applications where it is necessary to convert variable speed motive power into constant frequency electrical power for one or more AC loads. In the past, this has been accomplished in aircraft applications through the use of a hydromechanical constant speed drive which is coupled to the engine of the aircraft and which converts the variable speed motive power produced by the engine into constant speed motive power. A synchronous generator is coupled to the output of the constant speed drive and converts the constant speed motive power into constant frequency AC power for the loads. Such a generating system is sometimes referred to as an integrated drive generator (IDG).

More recently, attempts have been made at designing a practical generating system which converts variable speed motive power into constant frequency electrical power without the use of hydromechanical components in the constant speed drive. For example, Dishner et al. U.S. Pat. No. 4,695,776 and Borger U.S. Pat. No. 4,572,961 disclose electrically compensated constant speed drives which include a mechanical differential having a first input coupled to the output of the prime mover and an output coupled to a synchronous generator. A speed compensation link in the form of first and second permanent magnet machines interconnected by a power converter is coupled between the prime mover and a second input of the differential. The power flow between the permanent magnet generators is controlled so that the required compensating speed is provided to the second differential input shaft to maintain the output shaft at a constant speed.

An alternative to the foregoing systems that does not use a constant speed drive is referred to as a variable speed, constant frequency (VSCF) generating system which includes a synchronous generator coupled directly to the prime mover and a power converter which converts the variable frequency output of the generator into constant frequency power for the loads. Interest in VSCF systems has increased of late owing to the push to design "all electric" aircraft in which the use of mechanical, hydromechanical and hydraulic components is minimized.

Typically, the output voltage of the VSCF system at a point of regulation (POR) is controlled by controlling the excitation of the synchronous generator. For example, Baker U.S. Pat. No. 4,554,501 discloses a VSCF system which operates within a normal generator speed range to regulate inverter output voltage for AC loads by controlling exciter field current. During auxiliary operation when the speed of the generator is below the normal design speed range such that power cannot be supplied to AC loads, a DC voltage supplied to the inverter on a DC link is regulated at a desired level by controlling the exciter field current and the DC link voltage is provided to DC loads. Thus, DC link regulation is effective only during auxiliary operation when the speed of the generator is insufficient for the inverter to supply AC power to AC loads. In neither mode of operation does the system regulate inverter output voltage by controlling the inverter.

Glennon U.S. Pat. No. 4,527,226 discloses a VSCF control which determines a link value representing what the level of the DC link voltage should be based upon the load at the POR. The actual DC link voltage is measured and is divided by the link value to obtain a value $PUV_{DC}$ which is used to select a switch control pattern from a memory. The switch control pattern is used to control switches in the VSCF inverter. This control, however, does not attempt to control DC link voltage to in turn determine $PUV_{DC}$ in a way which minimizes distortion in the inverter output.

SUMMARY OF THE INVENTION

In accordance with the present invention, a control for a VSCF system minimizes distortion in the output of the system in a simple and effective manner.

More particularly, a control for a VSCF system having a generator including an exciter and which develops generator AC output power, a rectifier for rectifying the generator AC output power to produce DC power on a DC link and an inverter coupled to the DC link which is controlled to produce AC power at a desired frequency at an inverter output comprises means responsive to a parameter of the AC power for developing a control signal for controlling the inverter to maintain the parameter of the AC power at a desired level and means responsive to the control signal and to a signal representing a parameter of the DC power for controlling the generator exciter to maintain the parameter of the DC power at a particular level relative to the parameter of the AC power.

In the preferred embodiment, individual voltage regulation over the phase outputs of the inverter is accomplished by detecting the deviation of each phase output voltage from a reference voltage and by controlling each inverter phase using a waveform retrieved from a memory associated with such phase in accordance with the detected deviation so that the deviation is minimized. The control also subtracts the lowest of the signals representing the deviation of the phase outputs from a reference signal to derive a signal representing the desired DC link voltage. A signal representing the actual DC link voltage is subtracted from the desired DC link voltage signal to derive an error signal which is in turn used to control the excitation of the generator.

In an alternative embodiment of the invention, output voltage regulation is accomplished in accordance with the average of the phase output voltage and hence inverter output voltage is regulated on a collective basis, rather than on an individual basis.

In both of the embodiments, the control acts to force a value $PUV_{DC}$, representing the ratio of the voltage on the DC link to the peak fundamental AC output voltage of the inverter, to a desired value. This, in turn, insures that the DC link voltage is not too high or too low relative to the desired inverter output so that distortion in the output is minimized.

The present invention affords individual phase regulation for unbalanced loading in one embodiment and provides improved dynamic system performance in both embodiments. The invention is insensitive to system parameters and results in minimized weight and size of the inverter output filter.

DESCRIPTION OF THE PREFERRED EMBODIMENT

Figure 1:
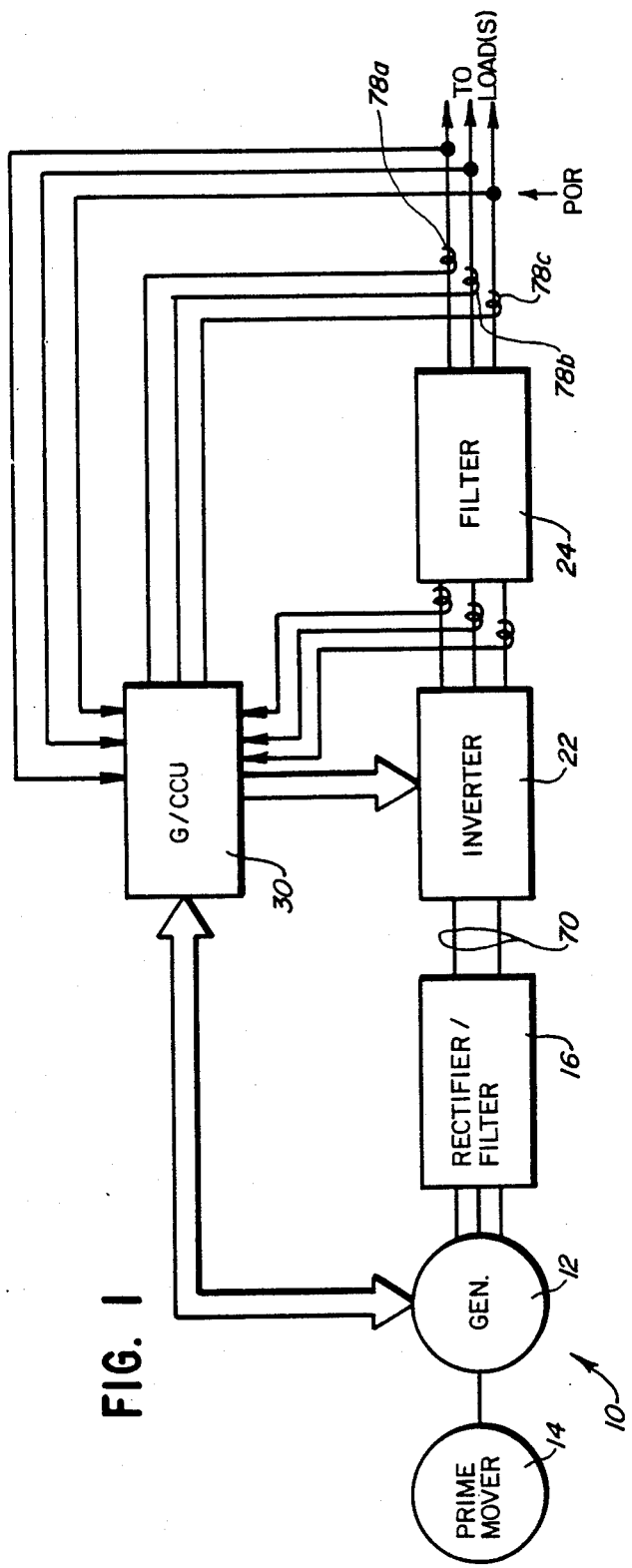
FIG. 1 is a block diagram of a VSCF system incorporating the control of the present invention.

Referring now to FIG. 1, a variable speed, constant frequency (VSCF) system 10 is illustrated. The VSCF system 10 includes a brushless, synchronous generator 12 driven by a variable speed prime mover 14 which may be, for example, an aircraft jet engine. The generator develops a polyphase, variable frequency AC output which is converted into DC power by a rectifier and filter 16. The resulting DC power is provided over a DC link 20 to an inverter 22 which converts the DC power into constant frequency AC power. This AC power is preferably filtered by an optional filter 24 and is provided to one or more AC loads (not shown).

Figure 3:
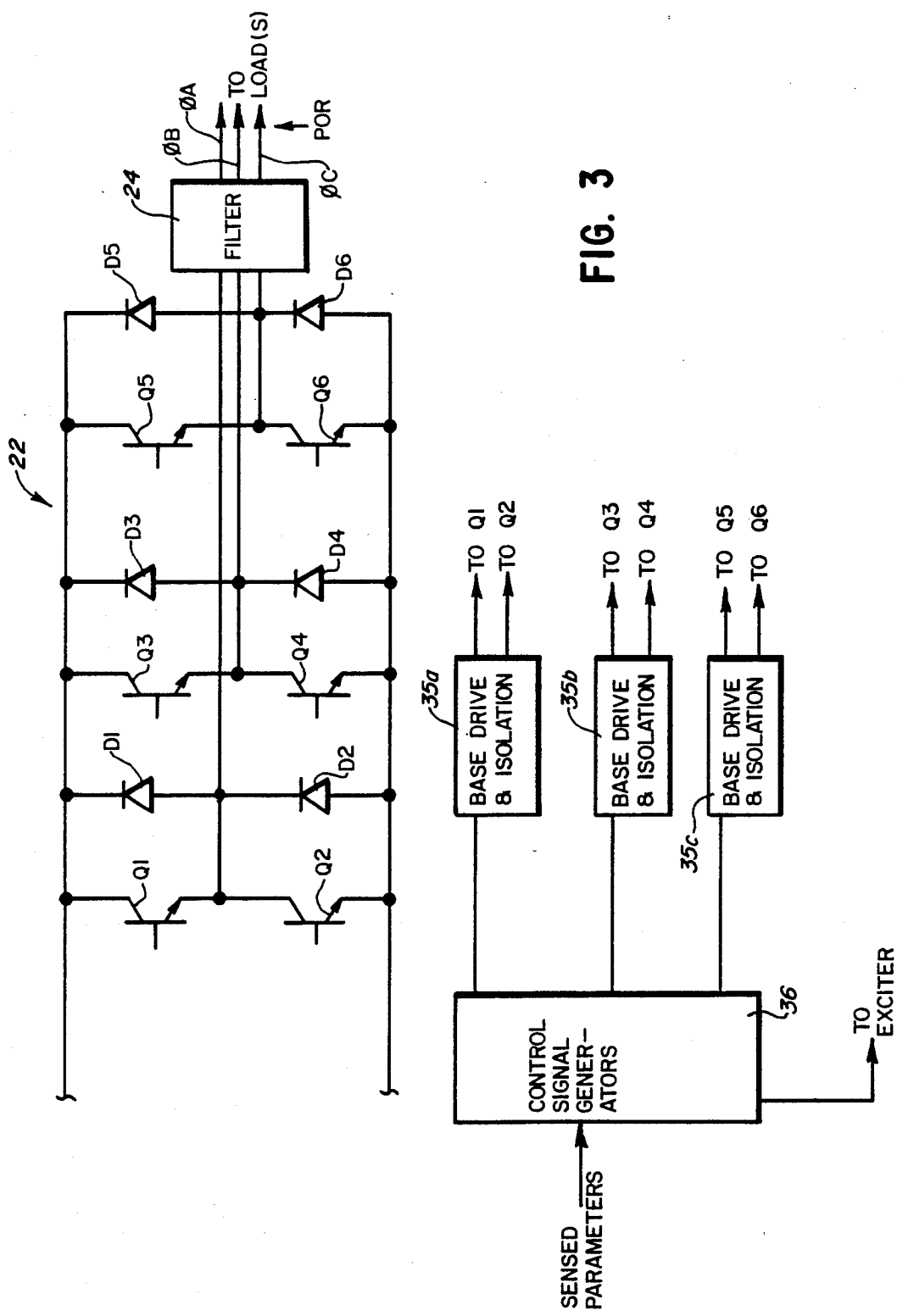
FIG. 3 is a combined schematic and block diagram of the control of the present invention in conjunction with a simplified representation of the inverter shown in FIG. 1.

The inverter 22 includes switches Q1-Q6, shown in FIG. 3, which are controlled by a generator/converter control unit or G/CCU 30. It should be noted that the present invention is not limited to use with the inverter topology shown in FIG. 3, but may be used with other inverter topologies, as desired.

Figure 2:
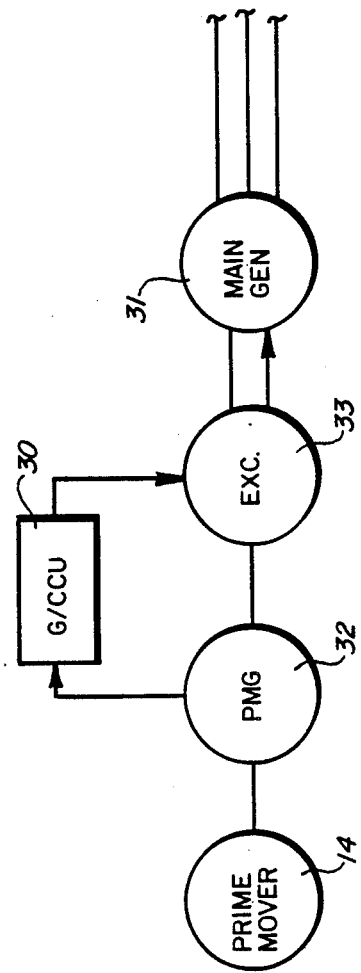
FIG. 2 is a block diagram of the prime mover and generator illustrated in FIG. 1.

Referring also to FIG. 2 and as noted in greater detail hereinafter, the G/CCU 30 is also coupled between a permanent magnet generator 32 and an exciter 33 of the generator 12. The exciter develops field current for a main generator portion 34. The power delivered to the exciter 33 is controlled by the G/CCU 30 in accordance with a parameter of the output power developed at a point of regulation (POR). The POR is at a point near the load and receives the power developed at the output of the filter 24, if used, or the power developed at the output of the inverter 22, if the filter 24 is not used.

Referring specifically to FIG. 3, the switches Q1-Q6 of the inverter 22 are connected in a conventional three-phase bridge configuration together with associated flyback diodes D1-D6. The switches are controlled by base drive signals developed by base drive and isolation circuits 35a-35c. Each base drive and isolation circuit 35a-35c receives a control signal developed by a control signal generator 36. The control signal generator 36 also controls the power applied to the exciter and is responsive to a parameter of the power at the POR.

Figure 4:
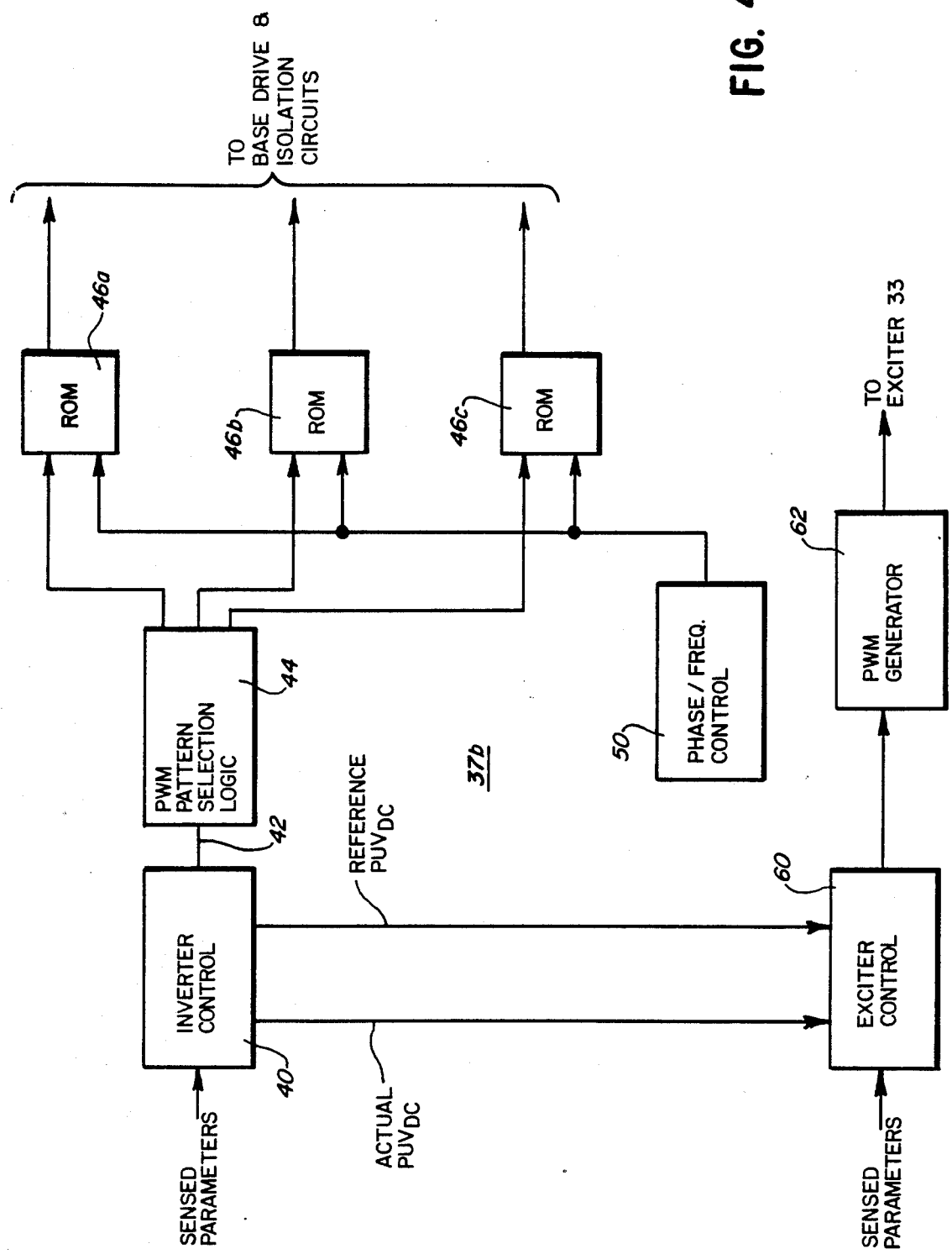
FIG. 4 is a combined schematic and block diagram of a portion of the control signal generator illustrated in block diagram form in FIG. 3.

Referring now to FIG. 4, there is illustrated in greater detail the control signal generator 36. The generator 36 includes an inverter control 40 which is responsive to sensed output parameters of the inverter 22 and filter 24 and which controls the operation of switches in the inverter 22. More specifically, the inverter control 40 develops a modulation index signal on one or more lines 42 and provides same to a PWM pattern selection logic circuit 44. The logic circuit 44 selects pulse width modulated (PWM) waveforms for each of the inverter phases. Each PWM waveform is stored as zeroes (representing notches) and ones (representing pulses) in successive storage locations of a memory 46a-46c. Each memory may comprise, for example, a read only memory (ROM). The timing and speed at which the successive memory locations are addressed are controlled by a phase/frequency control 50. The addressing timing and speed determine the phase and frequency of the signals produced by the memories 46a-46c. The control 50 may include hardware or software which precisely maintains the output frequency at a desired frequency and which maintains the correct phase separation in the inverter output phases.

It should be noted that the details of the control 50 are not necessary to an understanding of the present invention and hence will not be described in detail.

The inverter control 40 also develops at least one error signal representing the deviation of the POR voltage fundamental component from a desired amplitude. This signal, designated "actual $PUV_{DC}$" is coupled together with a reference $PUV_{DC}$ signal to an exciter control 60. The control 60 is also responsive to sensed parameters of the inverter as well as the frequency of the output of the PMG 32. The exciter control 60 develops an exoitation control siqnal which is coupled to a PWM generator 62 that in turn develops PWM waveforms which are coupled to the exciter 33.

Figure 5:
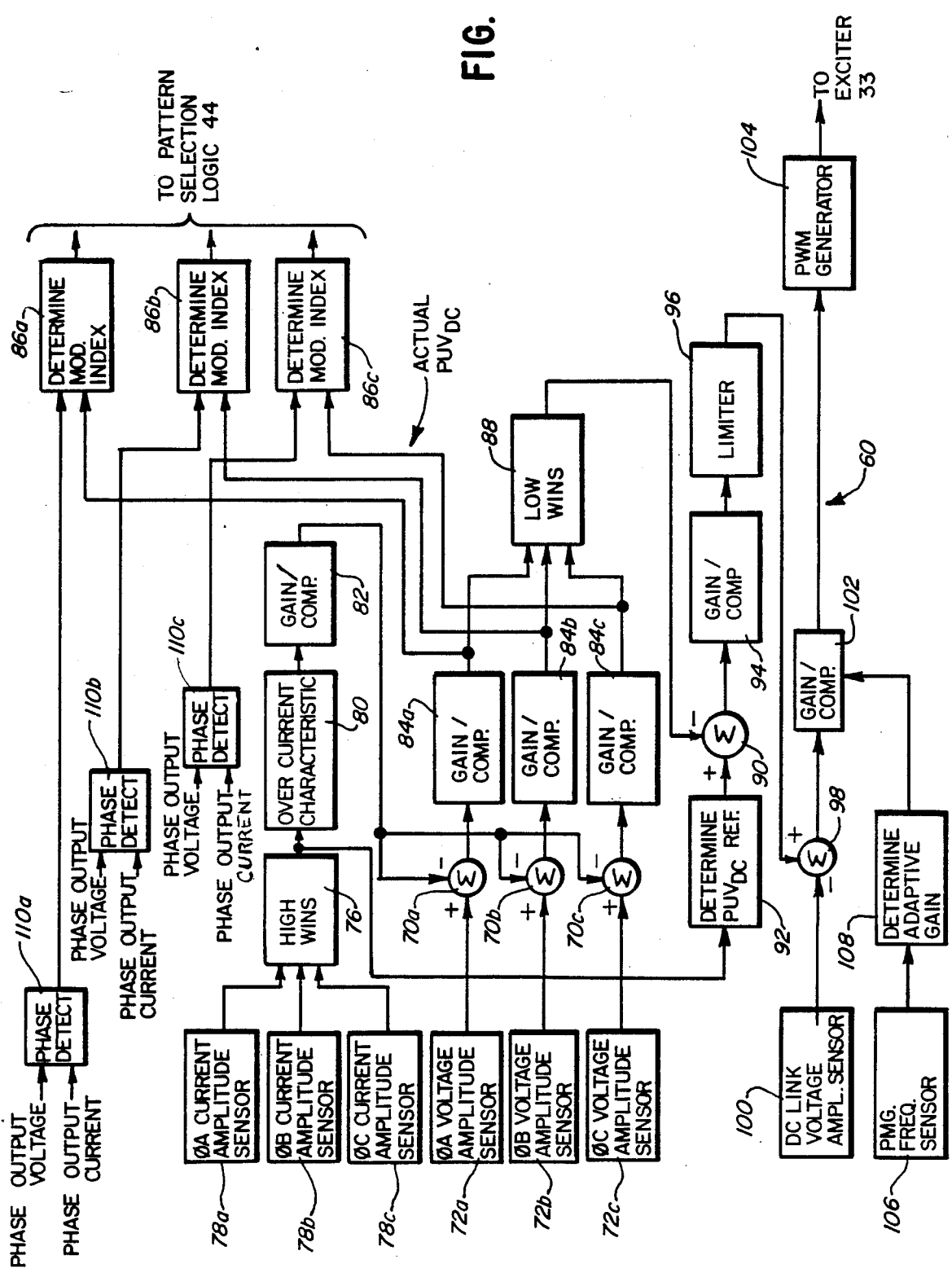
FIG. 5 is a block diagram of the $PUV_{DC}$ control and exciter control illustrated in block diagram form in FIG. 4 according to a preferred embodiment of the invention.

Referring now to FIG. 5, there is illustrated in greater detail the inverter control 40 and the exciter control 60. The controls 40 and 60 may be implemented in software or hardware, as desired.

The inverter control 40 includes first through third summers 70a, 70b, and 70c having non-inverting inputs coupled to the outputs of phase A, phase B and phase C voltage amplitude sensors 72a-72c which develop signals representing the amplitude of the POR phase voltages. The summers 70a-70c include inverting inputs which receive a voltage reference signal REF1 developed on a line 74. The reference signal REF1 represents the desired POR phase voltage amplitude and is derived by a high wins circuit 76 which passes the greatest of three current signals representing the POR phase currents as detected by sensors 78a-78c to an overcurrent characteristic circuit 80. The characteristic circuit 80 develops a voltage reference signal representing the desired POR voltage. This voltage reference signal is constant until an output current threshold is reached, beyond which the voltage reference is decreased. This operation acts to limit output current when such current exceeds a certain level so that output power from the VSCF system is limited. The output of the overcurrent characteristic circuit 80 is applied through a gain and compensation unit 82 to the inverting inputs of the summers 70a-70c.

The signals developed by the summers 70a-70c are error signals representing the deviation of the POR phase voltages from a desired level. The error signals are processed by gain and compensation units 84a-84c and are provided to modulation index determining circuits 86a-86c. The circuits 86a-86c develop signals representing the required depth of modulation of the PWM waveforms in order to reduce the deviation of the POR phase voltages from the desired level. The signals from the circuits 86a-86c are provided to the pattern selection logic circuit 44 which selects the appropriate waveforms from the memories 46a–46c.

The signal having the least magnitude of the compensated voltage error signals developed by the gain and compensation units 84a–84c is passed by a low wins circuit 88 to a further summer 90 as a signal representing the actual $PUV_{DC}$ value. This signal, in other words, is considered as being the actual ratio of DC link voltage magnitude to inverter fundamental output voltage and is subtracted from the $PUV_{DC}$ reference signal as developed by a reference signal generator 92 which is coupled to the output of the high wins circuit 76. The output of the summer 90 is a $PUV_{DC}$ error signal and represents a DC link voltage magnitude reference. This signal is processed by a gain and compensation unit 94, limited by a limiter 96 and applied to a non-inverting input of a still further summer 98. The signal from the limiter 96 represents the desired DC link voltage magnitude. A signal representing the actual DC link voltage magnitude, as detected by a sensor 100, is subtracted from the output of the limiter 96 to derive a DC link voltage magnitude error signal which is processed by a gain and compensation unit 102 and applied to a conventional PWM generator 104. The PWM generator 104 is in turn coupled to field windings of the exciter 33.

The gain and compensation unit 102 is preferably a variable gain device wherein the gain is determined by a frequency sensor 106 which develops a signal representing the speed of the generator as detected by sensing the output frequency of the PMG 32, and an adaptive gain determining circuit 108. The circuit 108 is used to maintain constant closed loop gain as the generator gain varies with prime mover speed.

The control illustrated in FIG. 5 forces the DC link voltage to be established at a desired ratio relative to the inverter output voltage. This desired ratio is a function of the load at the POR, and hence the desired ratio is determined by a circuit 92 which is responsive to the POR current. The DC link voltage is controlled to supply the highest phase load to thereby minimize distortion for the total of the three phases. It should be noted that the control can be modified so that a fixed reference is provided to the summer 90, if desired.

The inverter control 40 also includes phase detectors 110A–110C each of which is responsive to a respective phase output voltage and phase output current of the inverter 22 and which develops a signal representing the phase displacement between such voltage and current on a line 112. The signal on the line 112 is delivered to the modulation index determining circuits 86a–86c so that the inverter output power factor is taken into consideration when selecting control signals for the memories 46a–46c to in turn minimize distortion.

Figure 6:
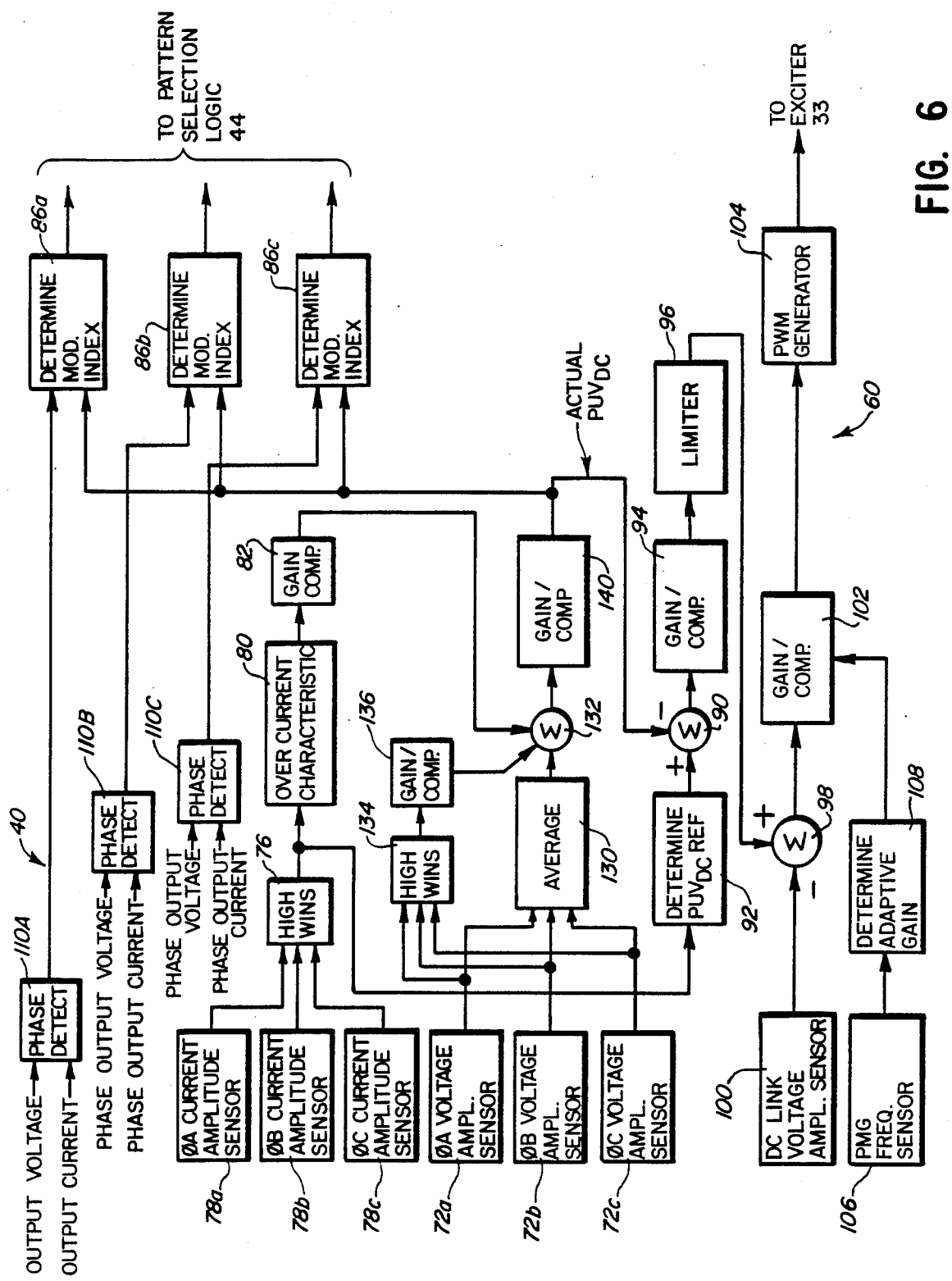
FIG. 6 is a block diagram similar to FIG. 5 illustrating an alternative embodiment of the invention.

Referring now to FIG. 6, there is illustrated modifications to the circuit of FIG. 5 to eliminate the individual phase voltage regulation. Elements common to FIGS. 5 and 6 are assigned like reference numerals. The summing junctions 70a–70c, gain and compensation units 84a–84c and low wins circuit 88 are replaced in part by an averaging circuit 130 which determines the average of the three phase output voltages of the inverter 22. This signal is applied to one input of a summer 132. Additional inputs of the summer 132 receive the output of the gain and compensation unit 82 and a high phase takeover signal developed by a high wins circuit 134 and a gain and compensation unit 136. The high wins circuit 134 passes the signal representing the highest phase output voltage to the gain and compensation unit 136. The output of the summer 132 comprises an inverter output voltage error signal which is processed by a gain and compensation unit 140 to produce the actual $PUV_{DC}$ signal. This signal is applied to the inverting input of the summer 90 as well as to the modulation index determining circuits 86a–86c. The circuits 130, 132, 134, 136, and 140 accomplish output voltage regulation based upon the average of the three phase output voltages. In the event of an overvoltage condition, the high wins circuit 134 and the gain and compensation circuit 136 cause the inverter control 40 to regulate inverter output voltage based on the highest phase voltage. This will have the effect of reducing the DC link voltage to cause the output voltage of the inverter to be reduced.

It should be noted that either of the embodiments shown in FIGS. 5 and 6 may be modified to eliminate the DC link voltage sensing loop. In such a case, the output of the summer 90 is applied directly to the gain and compensation unit 102 and the gain and compensation unit 94, the limiter 96, the summer 98 and the voltage sensor 100 are not necessary. Also in this case, it may be necessary to adjust the gain of the unit 102.

Also, in each of the embodiments, the gain and compensation units may implement a limiting function as desired or necessary.

It can be seen that both of the above embodiments control inverter output voltage by controlling generator excitation and inverter switching so that distortion in the inverter output is minimized. This leads to a favorable reduction in the size and weight of the output filter 24.

It should also be noted that the PWM waveforms may be generated by circuits or software other than the memories 46a–46c, for example, by PWM generators, if desired.

We claim:

1. A control for a variable speed, constant frequency (VSCF) system having a generator including an exciter and which develops generator AC output power, a rectifier for rectifying the generator AC output power to produce DC power on a DC link and an inverter coupled to the DC link which is controlled to produce AC power at a desired frequency at an inverter output, comprising:
   means for sensing a parameter of the AC power;
   means for sensing a parameter of the DC power;
   means responsive to the parameter of the AC power for developing a control signal for controlling the inverter to maintain the parameter of the AC power at a desired level; and
   means responsive to the developing means and to the parameter of the DC power for controlling the generator exciter to maintain the parameter of the DC power at a particular level relative to the parameter of the AC power.

2. The control of claim 1, wherein the developing means includes means for deriving an actual $PUV_{DC}$ signal representing the ratio of DC voltage magnitude developed on the DC link to inverter fundamental AC output voltage amplitude wherein such signal is provided to the controlling means.

3. The control of claim 2, wherein the inverter includes switches which are operated to produce the AC power and wherein the developing means further includes means responsive to the actual $PUV_{DC}$ signal for selecting a control waveform from a memory wherein the inverter switches are operated in accordance with the control waveform.

4. The control of claim 2, wherein the AC parameter sensing means comprises a voltage amplitude sensor which develops a signal representing the inverter AC output voltage amplitude and wherein the deriving means includes a summer which subtracts a reference signal from the signal produced by the voltage amplitude sensor to produce the actual $PUV_{DC}$ signal.

5. The control of claim 2, wherein the controlling means includes a first summer which subtracts the actual $PUV_{DC}$ signal from a $PUV_{DC}$ reference signal to derive a DC link reference representing a DC link voltage magnitude reference, a second summer which subtracts a signal representing the DC voltage magnitude from the DC link reference signal to derive a DC link voltage error signal and a PWM generator coupled to the second summer for developing a pulse width modulated waveform which is provided to the exciter.

6. The control of claim 5, wherein the generator is driven at varying speeds and wherein the controlling means further includes a variable gain and compensation unit coupled between the second summer and the PWM generator whereby the gain of the variable gain and compensation unit is determined in accordance with the speed of the generator.

7. The control of claim 5, wherein the inverter develops an output current magnitude at a point of regulation (POR) and wherein the $PUV_{DC}$ reference signal is produced in accordance with the POR current magnitude.

8. A control for a variable speed, constant frequency (VSCF) system having a generator including an exciter and which develops generator AC output power, a rectifier for rectifying the generator AC output power to produce DC power on a DC link and a polyphase inverter coupled to the DC link which converts the DC power on the DC link into N phase AC output power at a desired frequency, comprising:
   means for sensing a parameter of the N phase AC output power;
   means for sensing a parameter of the DC power;
   means responsive to the parameter of the N phase AC output power for developing control signals for controlling the inverter to maintain the parameter of the N phase AC output power at a desired level; and
   means responsive to the developing means and to the parameter of the Dc power for controlling the generator exciter to maintain the parameter of the DC power at a particular level relative to the parameter of the N phase AC output power.

9. The control of claim 8, wherein the inverter includes switches which are operated in accordance with the control signals to develop N phase output voltages and the AC parameter sensing means includes N voltage sensors which develop N amplitude signals representing the amplitude of the N phase output voltages and wherein the developing means includes N summers coupled to the voltage sensors which sum the amplitude signals with voltage reference signals to produce error signals and at least one memory which stores a plurality of control signals and which is responsive to the error signals to provide at an output thereof a particular control signal to reduce the magnitude of the associated error signal.

10. The control of claim 9, wherein the developing means includes a low wins circuit coupled to the summers for passing the error signal having the least magnitude to a second summer which sums such error signal with a second reference signal to produce a second error signal, a third summer coupled to the second summer which sums the second error signal with a signal representing DC link voltage to produce a DC link voltage error signal and a pulse width modulation (PWM) generator coupled to the third summer which develops a pulse width modulated waveform for the exciter based on the DC link voltage error signal.

11. The control of claim 10, wherein the generator further includes a permanent magnet generator (PMG) which develops variable frequency power and wherein the controlling means further includes a variable gain and compensation unit coupled between the third summer and the PWM generator whereby the gain of the variable gain and compensation unit is determined in accordance with the frequency of the PMG power.

12. The control of claim 9, wherein the inverter develops N phase output current magnitudes and wherein the voltage reference signals are produced in accordance with the highest phase output current magnitude.

13. The control of claim 8, wherein the inverter includes switches which are operated in accordance with the control signals to develop N phase output voltages and the AC parameter sensing means includes N voltage sensors which develop N amplitude signals representing the amplitude of the N phase output voltages and wherein the developing means includes an averaging circuit which develops an average amplitude signal representing the average of the N phase output voltage amplitudes, a summer coupled to the averaging circuit which sums the average amplitude signal with a voltage reference signal to produce an error signal and N memories each of which stores a plurality of control signals and each of which is responsive to the error signal to provide at an output thereof a particular control signal to reduce the magnitude of the error signal.

14. The control of claim 13, wherein the developing means includes a second summer which sums the error signal with a second reference signal to produce a second error signal, a third summer coupled to the second summer which sums the second error signal with a signal representing DC link voltage to produce a DC link voltage error signal and a pulse width modulation (PWM) generator coupled to the third summer which develops a pulse width modulated waveform for the exciter based on the DC link voltage error signal.

15. The control of claim 14, wherein the generator further includes a permanent magnet generator (PMG) which develops variable frequency power and the controlling means further includes a variable gain and compensation unit coupled between the third summer and the PWM generator whereby the gain of the variable gain and compensation unit is determined in accordance with the frequency of the PMG power.

16. The control of claim 13, wherein the inverter develops N phase output current magnitudes at a point of regulation (POR) and wherein the voltage reference signal is produced in accordance with the highest phase POR current magnitude.

* * * * *